June 17, 1952 D. H. PRITCHARD 2,600,919

DIVERSITY RECEIVING SYSTEM

Filed Dec. 8, 1949 2 SHEETS—SHEET 1

INVENTOR
Dalton H. Pritchard
BY Harry Tunick
ATTORNEY

June 17, 1952 D. H. PRITCHARD 2,600,919

DIVERSITY RECEIVING SYSTEM

Filed Dec. 8, 1949 2 SHEETS—SHEET 2

INVENTOR
Dalton H. Pritchard
BY
Harry Tunick
ATTORNEY

Patented June 17, 1952 2,600,919

UNITED STATES PATENT OFFICE 2,600,919

DIVERSITY RECEIVING SYSTEM

Dalton H. Pritchard, Riverhead, N. Y., assignor to Radio Corporation of America, a corporation of Delaware Application December 8, 1949, Serial No. 131,726

16 Claims. (Cl. 250—8)

Figure 1:
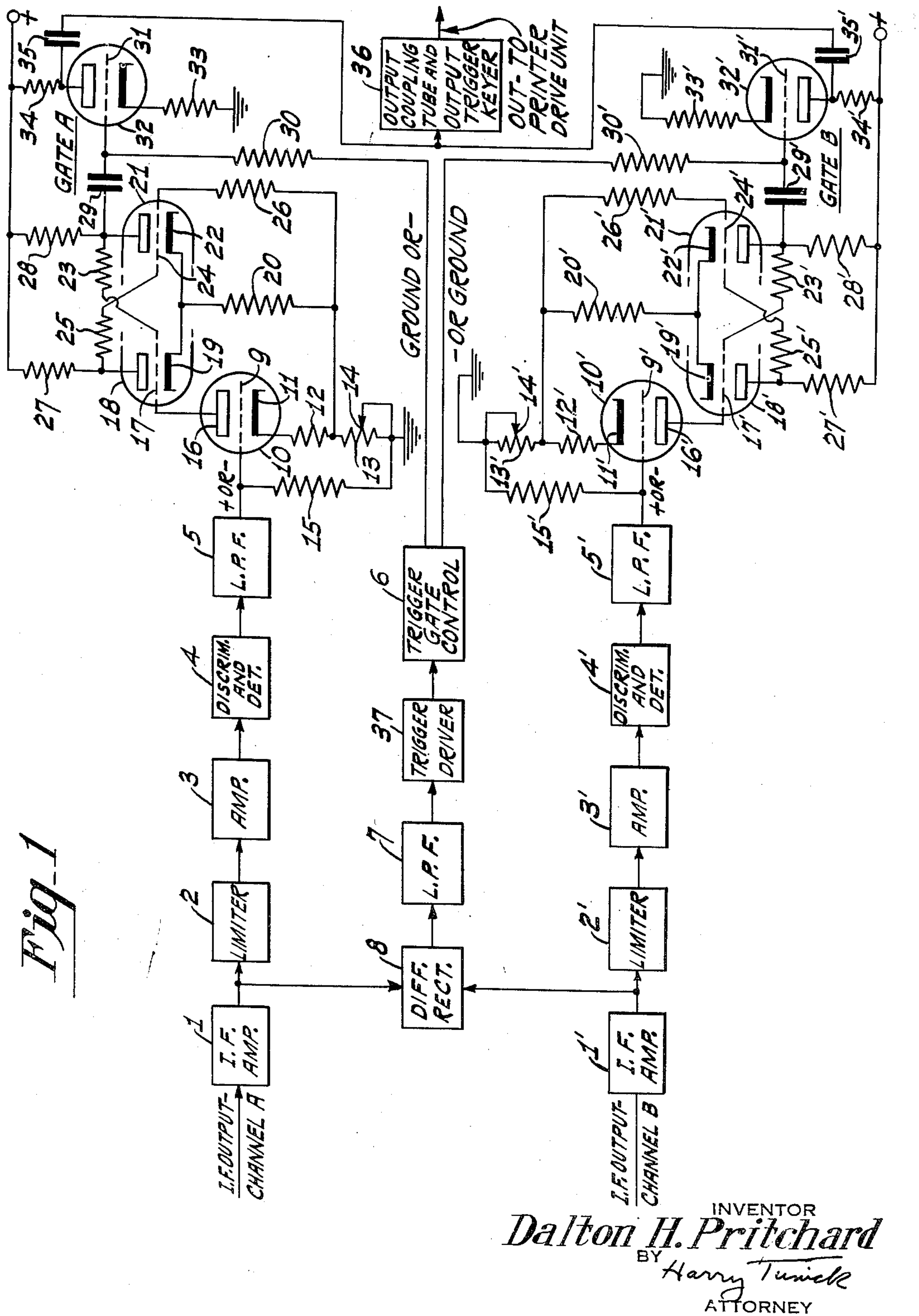

This invention relates to diversity reception, and more particularly to diversity reception of frequency shift keyed (FSK) telegraphy signals. The present invention discloses an improved gating system for selecting the best frequency shift keyed signal output from a diversity receiving system.

Numerous systems for performing the function of diversity receiver selection of FSK signals are known at present. However, such systems usually have one or both of two disadvantages. Firstly, they can be applied only to dual or two-set diversity, and quite often it is desirable to use three-set diversity reception. The terms "two-set diversity" and "three-set diversity" are employed herein to designate systems utilizing two receivers and three receivers, respectively, for individually receiving the same signal, and provided with a common output circuit. Secondly, the prior systems usually are capacitively coupled throughout those portions of the circuits in which the signal appears in the form of keyed direct current, or in other words in the form of a potential which varies from positive to negative direct current substantially symmetrically about ground or zero potential. In such a keyed direct current signal, a negative potential corresponds to space and a positive potential to mark, or vice versa. This capacitive coupling is ordinarily resorted to because it is more convenient than a possible alternative, which is to use direct or D. C. coupling throughout such "keyed D. C." portions of the diversity receiver circuits; this direct coupling would be rather undesirable, in one respect, because of the rather complicated circuit design required to provide the potentials necessary for proper operation of the tubes.

However, capacitive coupling in the keyed D. C. portion of the circuit produces an undesirable effect or result. The "weight of keying," or the per cent mark in the received signal (viz., the proportion of time occupied by the mark element of the received signal relative to the entire signal composed of both mark and space elements), affects the base level of the potential on the coupling condensers throughout the circuit. This results from the facts that the D. C. voltage corresponding to mark is in a direction to produce charging of such condensers (the voltage corresponding to space being in a direction to produce discharging of same) and that the time constants of the condenser coupling circuits are rather long, such time constants being necessary to properly pass the keying frequency variations of the D. C. potential; thus, such capacitors leak off their charges only rather slowly. Since the weight of keying affects such base potential on the condensers, the voltage change necessary to switch a tone keyer or other printer drive unit from one condition to the other in response to a change in received signal from mark to space or vice versa, and the time interval necessary for such a switching, both depend upon the signal weight or keying weight. Additional signal weight variations in the output, resulting from the above-described base potential changes, are undesirable and constitute an intolerable situation.

Among the objects of the invention are:

To devise a system which is readily applicable to three-set diversity reception; and To devise a circuit which is coupled in such a manner as to eliminate the above-described difficulties resulting from condenser charging and discharging, inherently present in other capacitively-coupled diversity receiving systems.

Figure 2:
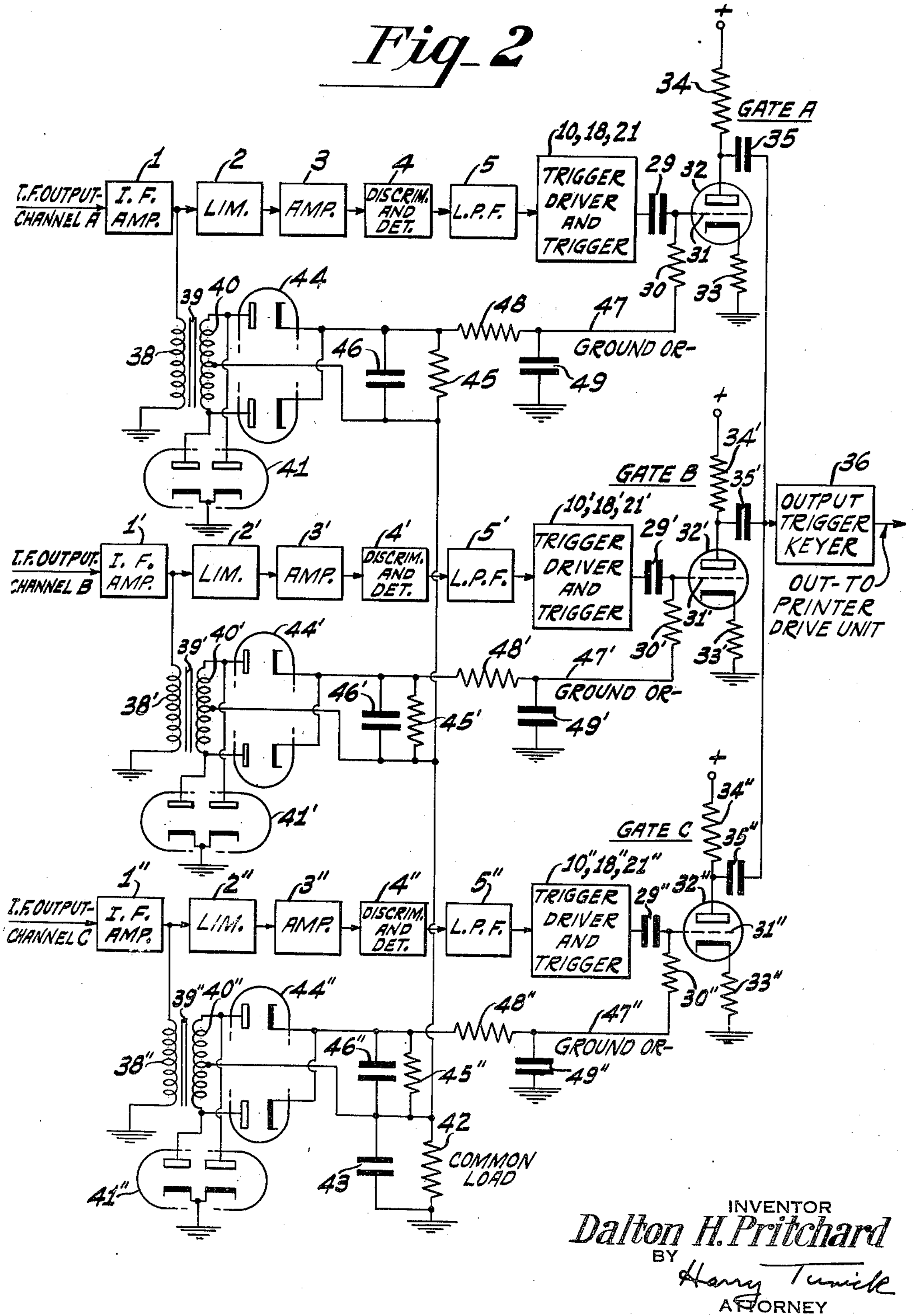

The foregoing and other objects of the invention will be best understood from the following description of some exemplifications thereof, reference being had to the accompanying drawings, wherein:

Fig. 1 is a diagrammatic representation of a portion of a two-set diversity receiving system utilizing this invention; and Fig. 2 is a diagrammatic representation of a portion of a three-set diversity receiving system utilizing this invention.

The objects of this invention are accomplished, briefly, in the following manner: The intermediate frequency signal output of each diversity receiver channel passes through the conventional amplifiers, limiter and discriminator type detector. The keyed D. C. output of each discriminator and detector passes through a suitable low-pass filter and drives a separate trigger or locking circuit. The square wave output of each locking circuit is differentiated to produce positive and negative pulses which are applied to a gate circuit, the separate gate circuits being controlled by potentials derived from the relative signal levels in the receiver channels. The gated positive and negative signal pulses drive a common output trigger or locking circuit which in turn drives or keys any suitable printer drive unit.

Referring now to Fig. 1, the intermediate frequency outputs of two diversity receiver channels A and B, derived from spaced signal pick-up devices, are applied respectively as inputs to two intermediate frequency amplifiers 1 and 1'. The intermediate frequency outputs of the two channels are derived from the two pick-ups by means of radio frequency amplifiers, converters and intermediate frequency amplifiers, in an entirely conventional manner. The portions of channels A and B illustrated in Fig. 1 are quite similar and for convenience only channel A will be described in detail; elements of channel B which are the same as those of channel A are denoted by the same reference numerals, primed.

The output of amplifier 1 may be at 50 kc. $\pm$ the frequency deviation FD, for example. The systems of this invention are particularly adapted to frequency modulation of the type known as frequency shift telegraphy, in which case the 50 kc. intermediate frequency is shifted from one frequency representing mark to another frequency representing space, the said other frequency being separated from said one frequency by several hundred cycles. The output of amplifier 1 is applied to a limiter 2 in which full wave limiting of the signals takes place. Limiter 2 may be as disclosed in Crosby Patent No. 2,276,565, dated March 17, 1942, or in the copending Schock et al. application, Serial No. 632,978, filed December 5, 1945, now Patent No. 2,515,668, dated July 18, 1950.

The limited intermediate frequency energy is amplified in amplifier 3 and supplied to a discriminator and detector circuit 4 of a modified Conrad type, as disclosed in the aforementioned Schock et al. application. The output of circuit 4 is in the form of keyed direct current, varying from positive to negative substantially symmetrically about zero potential or ground. The output potential of circuit 4 is alternatively positive and negative, positive potentials representing mark and negative potentials representing space, or vice versa. The output of discriminator and detector 4 is passed through a low-pass filter 5 to provide in the output thereof substantially pure direct current pulsating energy which varies alternatively from positive to negative with respect to ground.

The output signal of filter 5 is fed directly to the control grid 9 of a trigger driver triode 10 the cathode 11 of which is connected to ground through a fixed resistor 12 and a potentiometric resistor 13 the movable tap 14 of which is connected to ground. Grid 9 is connected to ground through a resistor 15.

Anode 16 of driver tube 10 is connected to the control grid 17 of a tube 18 of a trigger or locking circuit, the cathode 19 of tube 18 being connected through resistor 20 to a point between resistors 12 and 13; thus, voltage changes which occur in the cathode resistor 12 of tube 10 are in effect applied between grid 17 and cathode 19 of locking circuit tube 18. Tubes 18 and 21 comprise a pair of tubes connected in a trigger or locking circuit somewhat as disclosed in expired Finch Patent No. 1,844,950, dated February 16, 1932. The cathodes 19 and 22 of these tubes are connected together and in turn are connected to ground through resistor 20 and at least a portion of resistor 13, this portion being variable by movement of tap 14. The grid 17 is connected to the anode of tube 21 through resistor 23. The grid 24 of tube 21 is connected to the anode of tube 18 through resistor 25 and is also connected to ground through resistor 26 and at least a portion of resistor 13. The anodes of tubes 18 and 21 are connected to the positive terminal of a direct potential source through resistors 27 and 28, respectively. The connections of tubes 18 and 21 are such that these tubes are alternatively conductive, because when the anode potential of one thereof drops because of current flow therein, the control grid of the other thereof becomes more negative to cut off current flow in the other tube. In general, when current is caused to flow in tube 18, a tripping or switching or triggering action takes place to cut off the current in tube 21. When for some reason current is cut off in tube 18, the reverse operation takes place to initiate current flow in tube 21. The locking circuit including tubes 18 and 21 may be said to have two degrees of electrical stability, one in which tube 18 is conducting and the other in which tube 21 is conducting, since when either tube is conducting current flow will continue therein until the appropriate potential is supplied to grid 17 to switch the current flow to the other tube.

The intermediate frequency output of receiver channel B is treated in the same manner as is that of channel A, previously described. It is important, to reduce switching transients in the common output, that the triggers or locking circuits in the two channels A and B be adjusted to give a square wave output of identical per cent mark, or signal weight. This is accomplished by proper adjustment of taps 14 and 14' on resistors 13 and 13'.

Locking circuit 18, 21 is switched from one condition of stability to the other in response to each reversal of polarity of the direct voltage output of filter 5, applied to grid 9 of the driver tube. For mark, then, the locking circuit is in one condition of stability (say, tube 18 on) and for space is in the other condition of stability (say, tube 21 on). Since the switching in tubes 18 and 21 takes place extremely rapidly, each trigger circuit (of the two channels) produces a substantially square wave output, the sides of the square wave occurring when the received signal changes from mark to space and vice versa.

The square wave output of trigger circuit 18, 21 is applied through a differentiating network consisting of series capacitor 29 and shunt resistor 30 to the control grid 31 of a gate tube 32. The cathode of tube 32 is connected to ground through resistor 33, while the anode of such tube is connected to the positive potential source through resistor 34. For the time being, assume that gate tube 32 is conductive, so that the description of the signal amplifying chain of channel A may be completed. When 32 is amplifying, the positive and negative pulses resulting from the differentiation of the square wave output of the locking circuit 18, 21 appear at the anode of tube 32 and are passed through capacitor 35 to drive the output trigger or locking circuit 36 which may include an output coupling tube such as disclosed in the aforementioned Schock et al. application and which may also be of the double-trigger type, as disclosed in said application. Circuit 36 in effect reconverts the positive and negative pulses applied thereto to a square wave output which is applied to a suitable printer drive unit for utilization therein.

It should be pointed out at this juncture that the output signal of filter 5, which is a keyed direct voltage, is coupled directly rather than capacitively to the trigger driver tube 10, said tube being capable of operation directly by such keyed voltage, which varies alternatively positive and negative with respect to zero potential or ground. In this manner, the undesirable results produced in prior systems due to capacitive coupling in the "keyed D. C." portions of the circuits are entirely eliminated, no capacitors whatever being used herein in such portion of the circuit.

Although capacitive coupling is used in the circuit of this invention at 29 and 35, the signal at these points is in the form of pulses, rather than keyed D. C., due to the differentiation of the square wave output of the trigger circuit. Since capacitors 29 and 35 need pass only pulses of relatively short duration, rather than keyed direct voltage, they can be of small capacitance, and the time constants of the two RC coupling circuits can be quite short. For example, capacitor 29 may be of .001 mfd., resistor 30 of 470,000 ohms, and capacitor 35 of 330 mmfd. Therefore, such capacitors will discharge very rapidly, and in fact will discharge completely between successive pulses. As a result, the weight of keying cannot affect the base level of the potential on these coupling condensers; in other words, the bias effect produced in prior circuits by charging and discharging of the condensers in response to keying is completely nonexistent in the circuit of this invention.

Gate tubes 32 and 32′ are supplied with operating potentials in such a way that they conduct in a normal manner (that is, operate class A) if their grids are biased to ground or zero potential, and are cut off when their grids are biased sufficiently negative with respect to ground.

In the case of a two-set or two-receiver diversity system, such as shown in Fig. 1, the gate tubes 32 and 32′ can be controlled by the output of a gate control trigger or locking circuit 6 operated by a trigger driver 37, of the type described in the aforesaid Schock et al. application. An output is taken from each side of the trigger circuit 6 to control the gate tubes, the output connected to control grid 31 of tube 32 being through resistor 30 and the output connected to control grid 31′ of tube 32′ being through resistor 30′. The gate trigger supply potentials are so adjusted as to provide gating potentials which vary alternatively between ground potential and a negative value sufficient for cut-off of the gate tubes; the potential applied to grid 31 is negative when that applied to grid 31′ is zero or ground potential, and vice versa.

A portion of the output of each of the amplifiers 1 and 1′ is supplied or fed to a common differential rectifier 8 wherein the magnitudes of these two portions are compared and wherein a resultant potential, the magnitude of which indicates which channel has the better signal, is developed. This developed potential is fed through a low pass filter 7 to control a locking circuit or trigger circuit driver stage 37 for the trigger gate control 6 which opens gate A or gate B. The output potentials of unit 6 are of appropriate polarity to open the gate tube of that channel having the better signal as determined by differential rectifier 8. The differential rectifier 8 and the trigger driver 37 and trigger gate control circuit 6 may be, and preferably are, the same as the corresponding circuits disclosed in the said Schock et al. application.

Filter 7 is designed to have the same time delay as is introduced by the low pass filters 5 and 5′ which follow the discriminators in the signal branches. This causes the gating potential to arrive at the gate tube to be opened substantially coincidentally with the arrival thereat of the stronger keyed signal, rather than before or after the same, which would be undesirable since in the latter case the weaker signal would appear in the common output for a certain length of time. Also, since the shortest time interval desired between diversity switching operations is the time duration of one basic signalling element (this corresponding to the maximum frequency of voltage required to be passed by filter 7 in the switching branch), filter 7 can be low pass and can be exactly similar to filters 5 and 5′.

Resistors 30 and 30′ both have a large enough value to serve as isolating resistors, to decrease the amplitude of the gating transients appearing at grids 31 and 31′ (such transients resulting from changes in gate potential or from diversity switching operations) sufficiently to prevent operation of the output trigger 36 thereby. In other words, gating transients do not pass appreciably through the gate tubes and do not interfere with proper operation of the output trigger by frequency shift keyed signals.

Fig. 2 discloses the use of the gating system of this invention in a three-set or three-receiver diversity system. In Fig. 2, elements and units the same as those of Fig. 1 are denoted by the same reference numerals, and in channel C the reference numerals are double primed.

In Fig. 2, a diode biasing arrangement is employed to provide the gating potentials for the control of the three gates 32, 32′ and 32″. The intermediate frequency output of channel A, in addition to being fed to limiter 2, is fed to the primary 38 of transformer 39, the secondary 40 of which is connected to double diode 41 in a manner such as to produce full-wave rectification of the voltage appearing in said secondary. Diode 41 operates into a common load consisting of a resistor 42 and a capacitor 43 connected in parallel, one end of this parallel RC combination being grounded (as are the cathodes of diode 41) and the other end of said combination being connected to the midpoint of secondary 40.

Similarly, a portion of the intermediate frequency output of channel B is applied through a transformer to diode 41′ which is connected as a full-wave rectifier and which also operates into the common load 42, 43. A portion of the intermediate frequency output of channel C is applied through a transformer to diode 41″ which is connected as a full-wave rectifier and which also operates into the common load.

The voltage appearing in secondary 40 is also rectified in a full-wave manner by double diode 44 which operates into an individual load circuit consisting of a parallel RC combination 45, 46 which is connected between the cathodes of diode 44 and the midpoint of said secondary. Output lead 47 is connected to load circuit 45, 46 through a single-section RC filter 48, 49 which removes carrier frequency components and allows components at keying frequencies to pass. This filter 48, 49 corresponds more or less to filter 7 in Fig. 1. The voltage drop developed across load 45, 46 by diode 44 is of opposite polarity to that developed across load 42, 43 by diode 41, both voltages being considered with respect to their effects at the upper plate of capacitor 49.

Similarly, the voltages appearing in secondaries 40′ and 40″ are also rectified in a full-wave manner by respective diodes 44′ and 44″ which operate into the respective individual load circuits 45′, 46′ and 45″, 46″. Output lead 47′ is connected to load circuit 45', 46' through a filter 48', 49' which is similar to filter 48, 49, while output lead 47'' is connected to load circuit 45'', 46'' through a similar filter 48'', 49''. The voltage drops developed across each of the individual loads 45', 46' and 45'', 46'' are of opposite polarity to the voltages developed across the common load 42, 43 by the double diodes 41' and 41'' of the respective channels.

Assume for the moment a steady normal input to the primary winding 38'' of transformer 39'' and zero input to primaries 38 and 38'. This will produce at the upper end of resistor 42 a steady negative D. C. potential produced by the action of diode 41'' operating into its load 42, 43. Diode 44'' will operate independently of diode 41'', giving the same voltage drop but with opposite polarity across its load 45'', 46''; hence, the potential on lead 47'' with respect to ground will be zero for all levels of input to primary 38''. Since there is zero input to primaries 38 and 38' there will be no voltage drop across diode loads 45, 46 and 45', 46', which causes leads 47 and 47' to have the negative potential of the upper end of resistor 42.

If we now assume that the signal levels on primaries 38 and 38' are gradually increased, we will find that the negative potentials on leads 47 and 47' will approach zero linearly as these two I. F. signal levels approach the level of the I. F. signal on primary 38''.

To make the action somewhat clearer, let us assume that the I. F. signal level on primary 38'' is such as to produce at the upper end of resistor 42 a negative potential of twenty volts. Also, assume that the I. F. signal levels on primaries 38 and 38' are each three-quarters of the signal level on primary 38''. Since the three signals are effectively applied to a common diode load 42, 43, the strongest, namely that of channel C, will determine the voltage drop across this load, and it will be twenty volts. However, the voltage drop across diode load 45'', 46'' is also twenty volts and the drops across loads 45, 46 and 45', 46' are each only fifteen volts. Hence, the potential to ground of leads 47 and 47' will be minus five volts whereas the potential to ground of lead 47'' will be zero, it being recalled that the voltage drops across individual loads 45, 46 and 45', 46' and 45'', 46'' are all of polarities opposite to that across common load 42, 43. It may be seen that if all three I. F. inputs are equal in amplitude the three leads 47, 47' and 47'' will all be at zero potential with respect to ground.

Thus, it will be seen that the diode biasing circuit of Fig. 2 operates to provide gating potentials on leads 47, 47' and 47'' which vary between the limits of ground or zero potential and a negative potential sufficiently high to cut off the gate tubes, in dependence upon the relative I. F. signal levels in the three channels A, B and C. It will be recalled, in connection with Fig. 1, that the gate tubes conduct in a normal manner if their grids are biased to zero potential or ground, and are cut off when their grids are biased sufficiently negative with respect to ground; therefore, bias potentials which vary between ground and a negative value are desired and required for proper operation or control of the gate tubes herein. Such gate control or bias potentials are supplied by the diode biasing arrangements of Fig. 2.

Lead 47 is connected through resistor 30 to control grid 31 of gate tube 32, so that the potential on said lead may serve as a gating potential for gate A. Lead 47' is connected through resistor 30' to control grid 31' of gate tube 32', so that the potential on this lead may serve as a gating potential for gate B. Similarly, lead 47'' is connected through resistor 30'' to control grid 31'' of gate tube 32'', so that the potential on this lead may serve as a gating potential for gate C.

The diode biasing or gating arrangement in Fig. 2 is claimed in the copending Trevor application, Serial #106,465, filed July 23, 1949.

The signal portion of the circuit of Fig. 2, including the discriminators, triggers, differentiators, etc., is exactly the same as the signal portion of Fig. 1 and operates in the same way, so the description thereof will not be repeated here. Fig. 2 discloses a gate control which is a modification of Fig. 1, by the use of which diversity systems of more than two sets may be had. The advantages of the present invention enumerated above in connection with Fig. 1 are also obtainable with the system of Fig. 2. It will be noted from Fig. 2 that the gating system of this invention is readily applicable to three-set diversity reception.

What is claimed is:

1. In a diversity receiving system, a plurality of diversity receiver signal channels, a plurality of controllable gating devices equal in number to the number of signal channels, a separate locking circuit coupling each signal channel separately to a corresponding gating device, each locking circuit having two conditions of electrical stability and each comprising a pair of intercoupled electrode structures so arranged that the flow of current in one structure causes a cessation of current in the other structure, and vice versa, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

2. In a diversity receiving system for frequency shift keyed signals, a plurality of diversity receiver signal channels each including a discriminator detector the output of which is a direct signal voltage which varies from a positive value to a negative value and vice versa in accordance with the keying, a plurality of controllable gating devices equal in number to the number of signal channels, means including a separate locking circuit coupling the output of each signal detector separately to a corresponding gating device, each locking circuit having two conditions of electrical stability and each comprising a pair of intercoupled electrode structures so arranged that the flow of current in one structure causes a cessation of current in the other structure, and vice versa, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

3. In a diversity receiving system for frequency shift keyed signals, a plurality of diversity receiver signal channels, a discriminator detector in each signal channel, a plurality of locking circuits equal in number to the number of channels, each locking circuit having two conditions of electrical stability and each comprising a pair of intercoupled electrode structures so arranged that the flow of current in one structure causes a cessation of current in the other structure, and vice versa, a direct current coupling between the output of each signal detector and a corresponding one of the locking circuits, a plurality of controllable gating devices equal in number to the number of channels, means coupling the output of each locking circuit separately to a corresponding gating device to supply a locking circuit output wave representative of the received signal to each respective gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

4. In a diversity receiving system, a plurality of diversity receiver channels, a plurality of controllable gating devices equal in number to the number of channels, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, means for applying the signal in each channel to control a corresponding one of said locking circuits, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

5. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, means coupling the output of each detector to a corresponding one of the locking circuits, a plurality of controllable gating devices equal in number to the number of channels, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

6. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a direct current coupling between the output of each detector and a corresponding one of the locking circuits, a plurality of controllable gating devices equal in number to the number of channels, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

7. In a diversity receiving system for frequency shift keyed signals, a plurality of diversity receiver channels each including a discriminator detector the output of which is a direct voltage which varies from a positive value to a negative value and vice versa in accordance with the keying, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a low pass filter coupling the output of each detector to a corresponding one of the locking circuits, a plurality of controllable gating devices equal in number to the number of channels, means coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

8. In a diversity receiving system for frequency shift keyed signals, a plurality of diversity receiver channels each including a discriminator detector the output of which is a direct voltage which varies from a positive value to a negative value and vice versa in accordance with the keying, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a low pass filter coupling the output of each detector to a corresponding one of the locking circuits, a plurality of controllable gating devices equal in number to the number of channels, means coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, said last-named means including therein a low pass filter having the same signal time delay as that of the first-named low pass filters, means for controlling each of said gating devices by a corresponding one of the control potentials, and a common output circuit coupled to all of said gating devices.

9. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a direct current coupling including a low pass filter between the output of each detector and a corresponding one of the locking circuits, a plurality of controllable gating devices equal in number to the number of channels, means coupling the output of each locking circuit to a corresponding gating device, means for comparing the relative strengths of the signals in each channel and for producing a plurality of control potentials equal in number to the number of channels, the absolute magnitude of each potential depending on the relative signal strength in the corresponding channel, means for controlling each of said gating devices by a corresponding one of the control potentials, and a common output circuit coupled to all of said gating devices.

10. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a direct current coupling including a low pass filter between the output of each detector and a corresponding one of the locking circuits, a plurality of controllable gating devices equal in number to the number of channels, means coupling the output of each locking circuit to a corresponding gating device, means for comparing the relative strengths of the signals in each channel and for producing a plurality of control potentials equal in number to the number of channels, the absolute magnitude of each potential depending on the relative signal strength in the corresponding channel, said last-named means including therein a low pass filter having the same signal time delay as that of the first-named low pass filters, means for controlling each of said gating devices by a corresponding one of the control potentials, and a common output circuit coupled to all of said gating devices.

11. In a diversity receiving system for frequency shift keyed signals, a plurality of diversity receiver channels, a discriminator detector in each channel, a plurality of controllable gating devices equal in number to the number of channels, means including a low pass filter and a differentiating network coupled in cascade in the order named for coupling the output of each detector to a corresponding gating device, means for comparing the relative strengths of the signals in each channel and for producing a plurality of control potentials equal in number to the number of channels, the absolute magnitude of each potential depending upon the relative signal strength in the corresponding channel, said last-named means including therein a low pass filter having the same signal time delay as that of the first-named low pass filters, means for controlling each of said gating devices by a corresponding one of the control potentials, and a common output circuit coupled to all of said gating devices.

12. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a low pass filter coupling the output of each detector to a corresponding one of the locking circuits, a plurality of controllable gating devices equal in number to the number of channels, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit coupled to all of said gating devices.

13. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a low pass filter coupling the output of each detector to a corresponding one of the locking circuits, a plurality of controllable gating devices equal in number to the number of channels, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, said means including therein a low pass filter having the same signal time delay as that of the first-named low pass filters, means for controlling each of said gating devices by a corresponding one of the control potentials, and a common output circuit coupled to all of said gating devices.

14. In a diversity receiving system for frequency shift keyed signals, a plurality of diversity receiver channels, a discriminator detector in each channel, a plurality of locking circuits equal in number to the number of channels, each locking circuit having two conditions of electrical stability and comprising a pair of intercoupled electrode structures so arranged that the flow of current in one structure causes a cessation of current in the other structure, and vice versa, a direct current coupling including a low pass filter between the output of each detector and a corresponding one of the locking circuits, a plurality of controllable gating devices equal in number to the number of channels, a differentiating network coupling the output of each locking circuit to a corresponding gating device, means for comparing the relative strengths of the signals in each channel and for producing a plurality of control potentials equal in number to the number of channels, the absolute magnitude of each potential depending upon the relative signal strength in the corresponding channel, said means including therein a low pass filter having the same signal time delay as that of the first-named low pass filters, means for controlling each of said gating devices by a corresponding one of the control potentials, and a common output circuit coupled to all of said gating devices.

15. In a diversity receiving system for frequency shift keyed signals, a plurality of diversity receiver signal channels, a discriminator detector in each signal channel, a plurality of locking circuits equal in number to the number of channels, each locking circuit having two conditions of electrical stability and each comprising a pair of intercoupled electrode structures so arranged that the flow of current in one structure causes a cessation of current in the other structure, and vice versa, a direct current coupling between the output of each signal detector and a corresponding one of the locking circuits, a plurality of controllable gating devices equal in number to the number of channels, means coupling the output of each locking circuit separately to a corresponding gating device to supply a locking circuit output wave representative of the received signal to each respective gating device, means for comparing the relative strengths of the signals in each channel and for producing a plurality of control potentials equal in number to the number of channels, the absolute magnitude of each potential depending upon the relative signal strength in the corresponding channel, means for controlling each of said gating devices by a corresponding one of the control potentials, and a common output circuit capacitively coupled to all of said gating devices.

16. In a diversity receiving system, a plurality of diversity receiver signal channels, a controllable gating device in one of said signal channels, said device having a signal input circuit and a signal output circuit, a locking circuit coupled to the signal input circuit of said device to supply to such input circuit a locking circuit output wave representative of the received signal appearing in said one channel, said locking circuit having two conditions of electrical stability and comprising a pair of intercoupled electrode structures so arranged that the flow of current in one structure causes a cessation of current in the other structure, and vice versa, means for applying the received signal appearing in said one channel to said locking circuit, means responsive to the relative strength of the signal in said one signal channel as compared to the strength of the signals in the remaining signal channels for producing a control potential the absolute magnitude of which depends upon said relative strength, means for applying said potential to said device to control the same, and utilization means coupled to the signal output circuit of said device.

DALTON H. PRITCHARD.

REFERENCES CITED

The following references are of record in the file of this patent:

UNITED STATES PATENTS

| Number | Name | Date |
|---|---|---|
| 2,253,832 | Whitaker | Aug. 26, 1941 |
| 2,397,830 | Bailey | Apr. 2, 1946 |
| 2,447,057 | Crosby | Aug. 17, 1948 |
| 2,492,780 | Atwood | Dec. 27, 1949 |
| 2,495,826 | Schock | Jan. 31, 1950 |